UNITED STATES PATENT OFFICE.

FRANZ ROESSLER, OF PERTH AMBOY, NEW JERSEY.

PROCESS OF DECORATING BASE METALS, GLASS, &c., WITH PRECIOUS METALS.

SPECIFICATION forming part of Letters Patent No. 407,305, dated July 16, 1889.

Application filed October 22, 1888. Serial No. 288,833. (No specimens.)

*To all whom it may concern:*

Be it known that I, FRANZ ROESSLER, a subject of the Emperor of Germany, residing at Perth Amboy, in the county of Middlesex and State of New Jersey, have invented an Improvement in the Process of Decorating Base Metals, Glass, &c., with Precious Metals, of which the following is a description.

The decoration of base metals, glass, terra-cotta, and like bodies with precious metals has heretofore depended on the employment of processes which have been subject to serious objections, owing to the unavoidable loss of precious metal, or to the great amount of labor required. Some of these decorations lacked durability, and many objects—for instance, some easily-melting glass—could not be durably gilded or decorated with precious metals at all.

The object of the present improvement is to overcome these objections and to provide for the decoration of articles made of base metal, glass, terra-cotta, and like substances with precious metals.

The invention consists in employing an article of commerce known as "liquid bright gold," "liquid bright silver," or "liquid bright platinum," which articles comprise a solution of a sulphuret of gold, silver, or platinum in balsam of sulphur. In conjunction with such solution I use a preparatory coating or underlayer, which may be produced by spreading a suitable varnish or the like on the surface of the object to be decorated.

In carrying out my improvement I use as a preparatory coating or underlayer for the precious metals, a pellicle produced by heating carefully a varnish painted in a thin layer on the object to be decorated. By preference I use an asphalt varnish consisting of a solution of asphaltum in a volatile solvent, as spirits of turpentine or chloroform, which, when heated, produces a pellicle of coal; but any other suitable varnish or paint or the like may be used, the principal object being to produce an underlayer on the surface of the object to be decorated suitable for the purpose.

I paint a portion or portions or the whole of the object to be decorated with the varnish. This may be done by means of a common camel's-hair brush, or any other brush. If larger portions or the whole of the object should be decorated, the object may be dipped into the varnish. Care must be taken to insure a uniform distribution of the varnish. After the varnish has been applied, it is fired at as low a temperature and as slowly as is consistent with producing a dry even surface. The object so treated is allowed to cool off gradually. After it has become perfectly cool, the solution of the precious metal is applied. After the solution of the precious metal has been applied, it is fired. The temperature in this firing should ordinarily not rise above 300° to 400° centigrade; but this temperature may be regulated according to the object to be decorated.

What I claim as my invention, and desire to secure by Letters Patent, is—

The process of decorating articles of base metal, glass, terra-cotta, and the like, consisting in first applying varnish to the surface of such article, next drying the varnish, next applying a solution of the sulphuret of a precious metal and balsam of sulphur, and subsequently firing, substantially as specified.

FRANZ ROESSLER.

Witnesses:
FREDK. HAYNES,
ARTHUR H. GAMBLIN.